(12) United States Patent
Van Schepdael et al.

(10) Patent No.: US 7,350,660 B2
(45) Date of Patent: Apr. 1, 2008

(54) PLASTIC PRESSURE VESSEL FOR A FLUID AND METHOD OF MANUFACTURING SUCH A VESSEL

(75) Inventors: Ludo Van Schepdael, Herent (BE); Tony Vanswijgenhoven, Hasselt (BE)

(73) Assignee: Covess N.V., Houthalen (BE)

( * ) Notice: Subject to any disclaimer, the term of this patent is extended or adjusted under 35 U.S.C. 154(b) by 435 days.

(21) Appl. No.: 10/513,425

(22) PCT Filed: Apr. 16, 2003

(86) PCT No.: PCT/EP03/50108

§ 371 (c)(1),
(2), (4) Date: Nov. 2, 2004

(87) PCT Pub. No.: WO03/093703

PCT Pub. Date: Nov. 13, 2003

(65) Prior Publication Data

US 2005/0173430 A1 Aug. 11, 2005

(30) Foreign Application Priority Data

May 3, 2002 (EP) .................................. 02100442

(51) Int. Cl.
*F17C 1/00* (2006.01)

(52) U.S. Cl. .................................................... 220/4.07

(58) Field of Classification Search ..................... None
See application file for complete search history.

(56) References Cited

U.S. PATENT DOCUMENTS 4,004,706 A * 1/1977 Guldenfels et al. ......... 220/586
4,222,804 A * 9/1980 Short ........................... 156/182
4,579,242 A 4/1986 Ellis, III
5,197,628 A 3/1993 Phan et al.
5,595,321 A * 1/1997 Berglund .................... 220/565

FOREIGN PATENT DOCUMENTS

EP 0461979 A1 6/1991
WO WO 92/20954 A 11/1992
WO WO 00/09321 A 2/2000

* cited by examiner

*Primary Examiner*—Stephen Castellano
(74) *Attorney, Agent, or Firm*—Townsend and Townsend and Crew LLP

(57) ABSTRACT

A plastic pressure vessel comprises a first (1, 2) and a second part (2, 1) welded to each other. The first part (1) comprises a layer (11) of thermoplastic material having substantially continuous fibres. The second part comprises a layered structure having an first (20) and a second (22) layer of thermoplastic material having substantially continuous fibres separated by a central (21) layer comprising thermoplastic material. The layer having substantially continuous fibres (11) of the first part extends over a length (d) sandwiched in between and connected with the first (20) and second (22) layer of thermoplastic material having substantial continuous fibres of the second part. Preferably the second part is provided with a slit (24) and the first part with a fitting protrusion, preferably with a bevelled end (23).

12 Claims, 6 Drawing Sheets

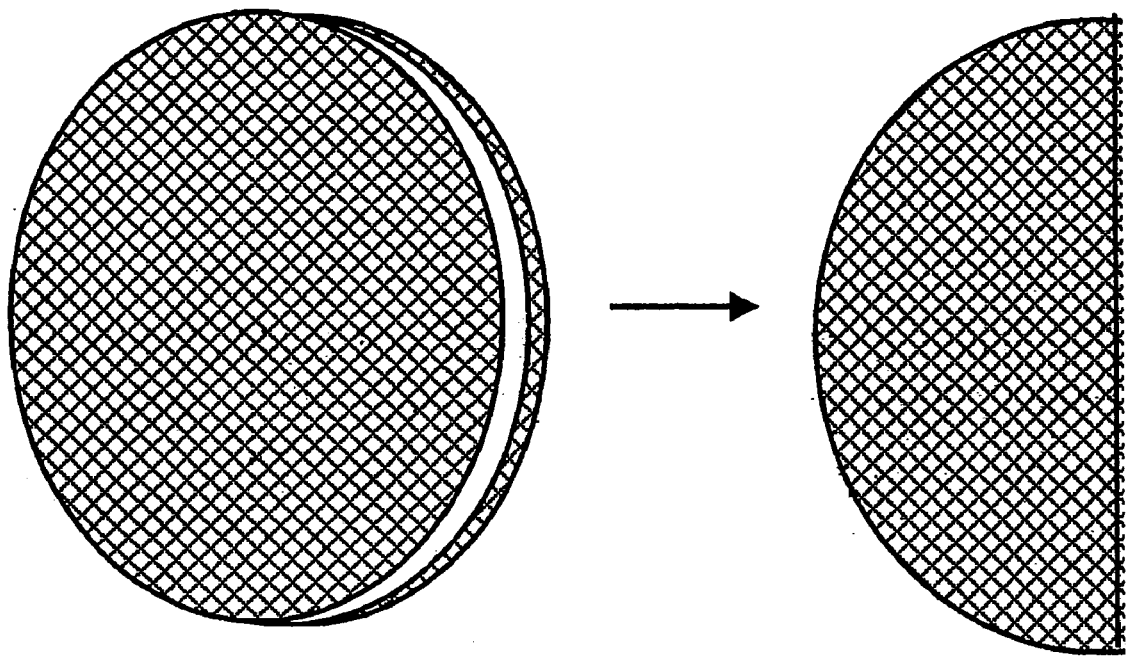
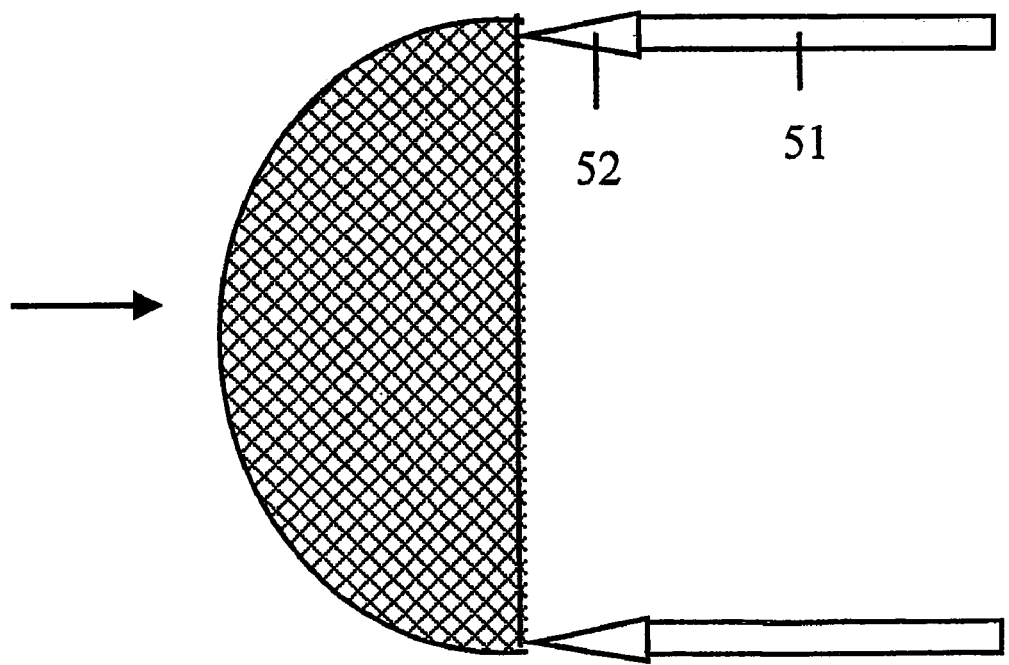
Fig. 5

PLASTIC PRESSURE VESSEL FOR A FLUID AND METHOD OF MANUFACTURING SUCH A VESSEL

DESCRIPTION OF PRIOR ART

The invention relates to a plastic pressure vessel for a fluid comprising a first and a second part connected to each other, one of the first and second part being a main body or an end part. Within the framework of the invention the term 'fluid' comprises gasses as well as liquids.

The invention also relates to a method of manufacturing a plastic pressure vessel comprising a first and a second part, one of the first and second part being a main body or an end part, comprising a method step in which the main body and the end part are connected to each other.

Plastic pressure vessels are known. One of the main advantages of using plastic materials over metals is formed by a reduction in weight.

Conventionally the plastic pressure vessels are made by means of blow moulding or injection moulding.

Although such vessels are relatively easy to make, the pressure range in which they operate safely is limited.

In EP 0 461 979 a pressure vessel is shown of which the main body comprises an inner layer of a thermoplastic material and an outer layer of a plastic material further comprising fibres. The main body is made by winding the layers one over the other on a mandrel.

The end part is made by means of injection moulding of a thermoplastic material.

In EP 0 461 979 the end part and the main body are connected to each other by using an electrical resistor through which a current is fed. The generated heat fuses the parts together.

The known method has as a drawback that the electrical resistor remains in the pressure vessel, which adds to the weight and in time could weaken the pressure vessels. From WO 92/20954 a pressure vessel is known comprised of two tank halves comprising fibre-reinforced plastic materials. The edges of the tank halves are cut under an angle and glued together. Around the glued seam a reinforcing girdle of fibre-reinforced plastic material is positioned.

Although these known vessels function relatively well they cannot safely withstand relatively high pressures or if they do, the costs of providing such safety is very high.

There is therefore a need for providing a pressure vessel capable of withstanding high pressures while at the same time doing so in an economic manner and in a flexible manner.

SUMMARY OF THE INVENTION

It is an object of the invention to provide a pressure vessel that can withstand on average higher pressures, while the production process and design remains flexible and at 'low cost'.

To this end the first part comprises at least one layer of thermoplastic material having substantially continuous fibres, and the second part comprises a layered structure having a first and a second layer of thermoplastic material, at least one of said first and second layers having substantially continuous fibres, said first and second layers being separated by a inner plastic layer, the layer having substantially continuous fibres of the first part extending over a length sandwiched in between and connected with the first and second layer of thermoplastic material of the second part.

The substantially continuous fibres (i.e. having a length longer than 25 mm, but preferably longer than 50 mm) of the at least one layer of the first part and of the first and/or second layer of the second part form over a length a connection. The sandwich-connection between the three layers, at least two of which comprising continuous fibres, provides for a strong bridge between the parts enabling a substantial increase in strength of the vessel especially against high pressures. Whereas in conventional blow moulded or injection moulded plastic pressure vessels pressure up to 20-30 bars are attainable before burst at reasonable costs and weight, pressure vessels in accordance with the invention have attained pressures well over 75 bar, without (greatly) increasing the costs. The inherent strength of the connection between the layers in the pressure vessel in accordance with the invention removes or at least reduces the need for providing a reinforcing girdle around the glued seam as known from WO 92/20954, reducing the complexity and costs of the process and the pressure vessel as well as offering the possibility of a reduction in weight. Preferably both of the first and second layers of the second part comprise substantially continuous fibres. Providing substantially continuous fibres in both of the first and second layers adds additional strength of the connection and thus to the pressure vessel, such in comparison to embodiments of the invention in which only one of the first and second layers is provided with substantially continuous fibres. Said latter embodiments, however, are less costly and thus suited for embodiments in which relatively lower maximum pressures are applicable but costs are a major consideration. Preferably the inner layer of the second part comprises thermoplastic material. Provision of thermoplastic material in the inner layer gives the possibility that the layer of the first part is also connected to the inner layer providing further strength to the connection.

Preferably at least one of the first and second part is a cylindrically formed main body of the pressure vessel, at both sides being provided with end parts.

In these embodiments the length of the cylindrical body may be chosen, offering a flexibility in the design, i.e. the volume of the pressure vessel is not restricted. In this respect it is remarked that the design shown in WO 92/20954 must be made of two halves, the present invention removes this restriction, enabling a more flexible design.

Preferably in such preferred embodiments the end parts of the vessel are provided with attachment means and have a higher maximum bursting pressure that the main body. This condition ensures that the main body on average is the most likely to fail. If the pressure vessel is to fail, safety is best guaranteed if the likelihood of loose parts is reduced.

Preferably the second part comprises a slit into which a protrusion of the layer comprising substantially continuous fibres of the first part extends. Providing a slit, rather than forcing the first part into the second part, enables a better and stronger connection to be obtained.

Preferably the protrusion is bevelled. The provision of such a protrusion (which could be in the form of a V-shape) increases the strength of the seam considerably.

Preferably the connection of the end part and the main body is formed such that the continuous fibres containing layer of the first part extend, seen in a direction parallel to the layers, over a length between 10-100, preferably between 20 and 50 mm in between the first and second layers of the second part (at least one of said layers comprising substantially continuous fibres). Too small an extension increases the risk that the seam comprises weak spots. However, too wide an overlap increases the risk that the innermost or outermost parts of the seam are not well connected, reducing the strength of the seam. The indicated amount of overlap of the fibres containing layers in the end part and the main body adds to the strength of the seam of the vessel without the mentioned negative possible side-effects. Preferably the length of the substantially continuous fibres in all relevant layers is at least equal, preferably at least twice the overlap between the layers. Preferably the substantially continuous fibres are laid in both parts and all relevant layers in a criss-cross pattern, extending across the seam. Such a pattern increases the strength of the seam.

Preferably the first part comprises an inner layer of thermoplastic material. Such an inner layer upon which the layer comprising substantially continuous fibres is provided, increases the air tightness of the vessel, as well as chemical resistance to the fluid contained in the vessel. Preferably, however, this inner layer does not extend in the connection between the first and second part.

Preferably the first part comprises an outer layer over the layer comprising substantially continuous fibres. This outer layer provides for a finish of the first part, as well as UV resistance and/or chemical resistance to the fluids of the environment. Preferably, however, this outer layer does not extend in the connection between the first and second part.

It is further an object to provide for a fast, safe and economic method for connecting the main body and the end part, yet resulting in a strong bond between them.

To this end the end part and the main part are connected to each other by friction welding, i.e. by placing the to be connected surfaces of the to be connected layers of the first and second part against each other and moving the surfaces along each other so that heat is generated. This can be done by rotating (in case the contact area is circular) the main body and/or the end part around the axis of symmetry of the contact area.

Within the framework of the invention 'friction welding' is to be understood as methods in which kinetic energy of one part is transferred into heat by friction between the parts thereby enabling welding of the layers This can be done in several ways:

- One of the parts (main body or end part for instance) is spun, whereafter the spun part is left to freely rotate, the parts are brought close to each other, and the connection is made. The friction between the freely rotating part and the stationary part, along the overlap, provides heat, which melts the thermoplastic material and provides for a connection. This may be called 'rotational inertia friction welding', i.e. the inertia of the rotation part provides for the heat, via friction.
- Instead of letting the rotation part freely rotate, said part is rotated during the welding operation. This has the advantage of a better control over the supply of heat. This could be called 'forced rotational friction welding'
- One of the parts is not rotated but vibrated. Such vibrational movement can be back and forth along the overlap, or a vibrational rotational movement, i.e. a twisting movement, or any combination of such movements.

The fact that the fibres are substantially continuous adds to the strength of the connection between the end part and the main body.

Preferably the vessel comprises a central body part and two end parts, the central part and the end parts as second parts are friction welded together while the end parts and/or the main body are rotated. Simultaneous welding of the central and end parts together improves the speed of the process. Preferably the end parts are rotated synchronously. Preferably the end parts are provided with handles integrated, prior to friction welding. Such handles can be used to connect the pressure vessel to other vessels or to a supporting structure. (f.i. the frame of a truck). Providing the handles after friction welding is more complicated and costly. The synchronous rotation of the end parts ensures that the relative position of the handles stays the same. 'Handle' is within the concept of the invention to be understood any element to which something may be attached or connected.

These and other aspects of the invention are apparent from and will be elucidated with reference to the embodiments described hereafter.

SHORT DESCRIPTION OF THE DRAWINGS

In the drawings:

FIG. 5 illustrates a preferred embodiment for manufacturing an end cap

The figures are not drawn to scale. Generally, identical components are denoted by the same reference numerals in the figures. All figures are given by means of illustration of exemplary embodiments of the invention.

DETAILED DESCRIPTION OF PREFERRED EMBODIMENTS

Figure 1:
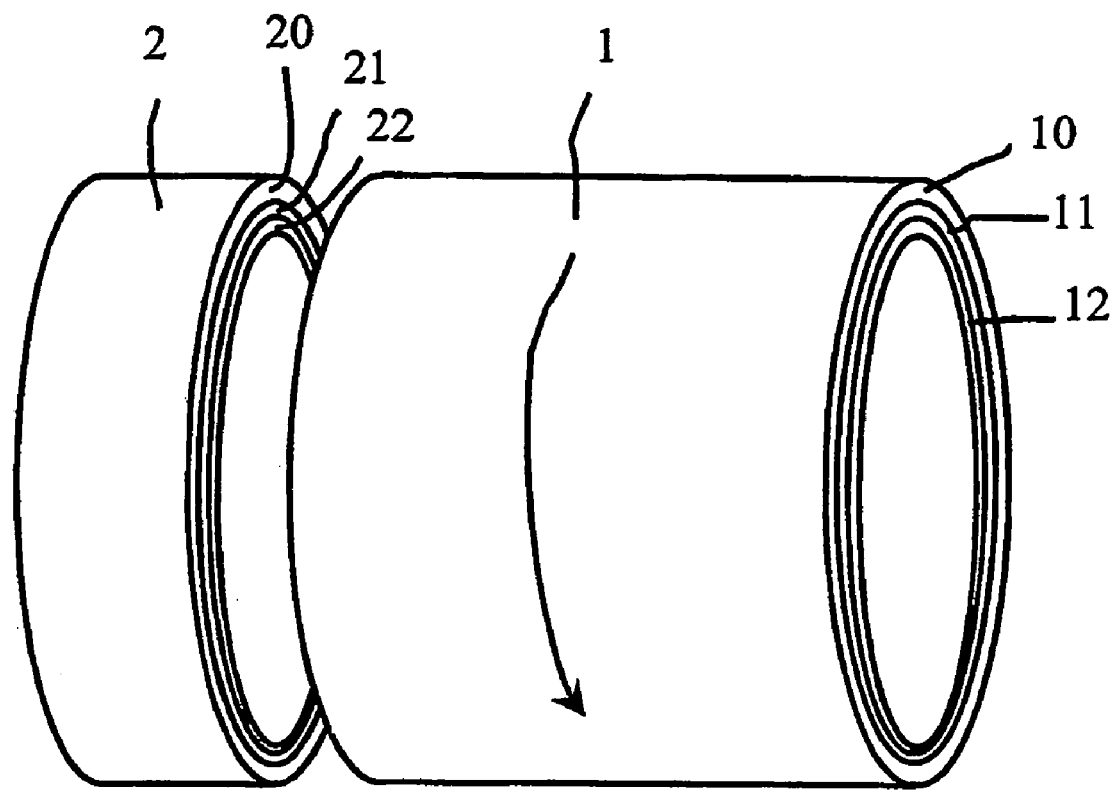
FIG. 1 shows schematically a main body and an end part of a pressure vessel in accordance with the invention.

FIG. 1 shows a main body 1 of the pressure vessel. The main body comprises in this exemplary embodiment a layered structure which comprises an outer layer 10 of a thermoplastic material, a central layer 11 of a thermoplastic material comprising substantially continuous fibres and an inner layer 12 of thermoplastic material. The inner layer 12 and the outer layer 10 are within the framework of the invention optional but preferred layers, the inner layer 12 can be useful to increase the air-tightness of the vessel and chemical resistance, while the outer layer 10 can be useful to improve the visual appearance of the vessel and UV and/or chemical resistance. The end part 2 comprises an outer layer 20 of thermoplastic material comprising substantially continuous fibres, an inner layer 22 comprising substantially continuous fibres and a central layer 21 comprising in this example a thermoplastic material. The thermoplastic material of the central layer 21 can also comprise fibres. The layers 11, 20 and 22 can by way of example be made from glass fibres co-mingled with polypropylene thermoplastic binding fibres. The presence of the continuous fibres in the layer 11 of the first part (in this example a main body) and in at least one, but preferably both of the layers 20 and 22 of the second part (in this example an end part) substantially increases the strength of the connection and thereby of the vessel, even more so when both of the layers 20 and 22 comprise substantially continuous fibres, and enables also to use, in particular for the thermoplastic layers 10, 12 and/or 21 relatively inexpensive materials such polypropylene.

Preferably the thermoplastic material substantially is polypropylene, PA, PET or PBT. When, within the framework of the invention mention is made of 'layers of thermoplastic material with substantially continuous fibres' or 'layers of thermoplastic material' this does not exclude such a layer from comprising additional components, such as pigments, fillers, additional small (cut) fibres, anti-corrosion agents, protective inner or outer coatings, flame retardants, etc, etc. In this example the main body comprises layers 10 to 12 and the end part layers 20 to 22, within the framework of the invention fall also embodiments in which the end part comprises layers 10 to 12 and the main body layers 20 to 22, and central layer 11 is at the seam sandwiched between outer layers 20 and 22. The first part may also be one end part, while the second part is another end part. It is preferred though that the pressure vessel comprises a cylindrical main body, at one, preferably both edges connected to end parts. This enables a flexibility in the design, i.e. by choosing the length of the main body the volume of the pressure vessel can be freely varied, without having an influence on the connection. In such embodiments both end parts are preferably of the same design, which reduces the complexity of the design and production method.

FIG. 1 also illustrates schematically the method in accordance with the invention: the facing surfaces of the main body 1 and the end part 2 are pushed against each other, while the main body (or the end part) is rotated or more general moved in the direction schematically indicated by an arrow in FIG. 1. The friction between the touching surfaces melts the thermoplastic materials forming a joint between the main body 1 and the end part 2. Because of the continuous nature of the fibres a very strong bond is achieved. This can be done for instance by spinning one part and then letting it freely rotate and pushing said part against the other part. The friction between the two parts will on the one hand cause the weld to be made, while on the other hand the spinning part is brought to a halt. Preferably, however, one of the parts is actively driven while being rotated. Such a method gives a much better control over the friction welding process. During the friction welding the force needed for rotating one of the parts, or for keeping the other part in place, may be measured and used as a parameter for controlling the rotational speed and/or the relative movement of the parts, which enables a better control over the welding process.

Figure 2:
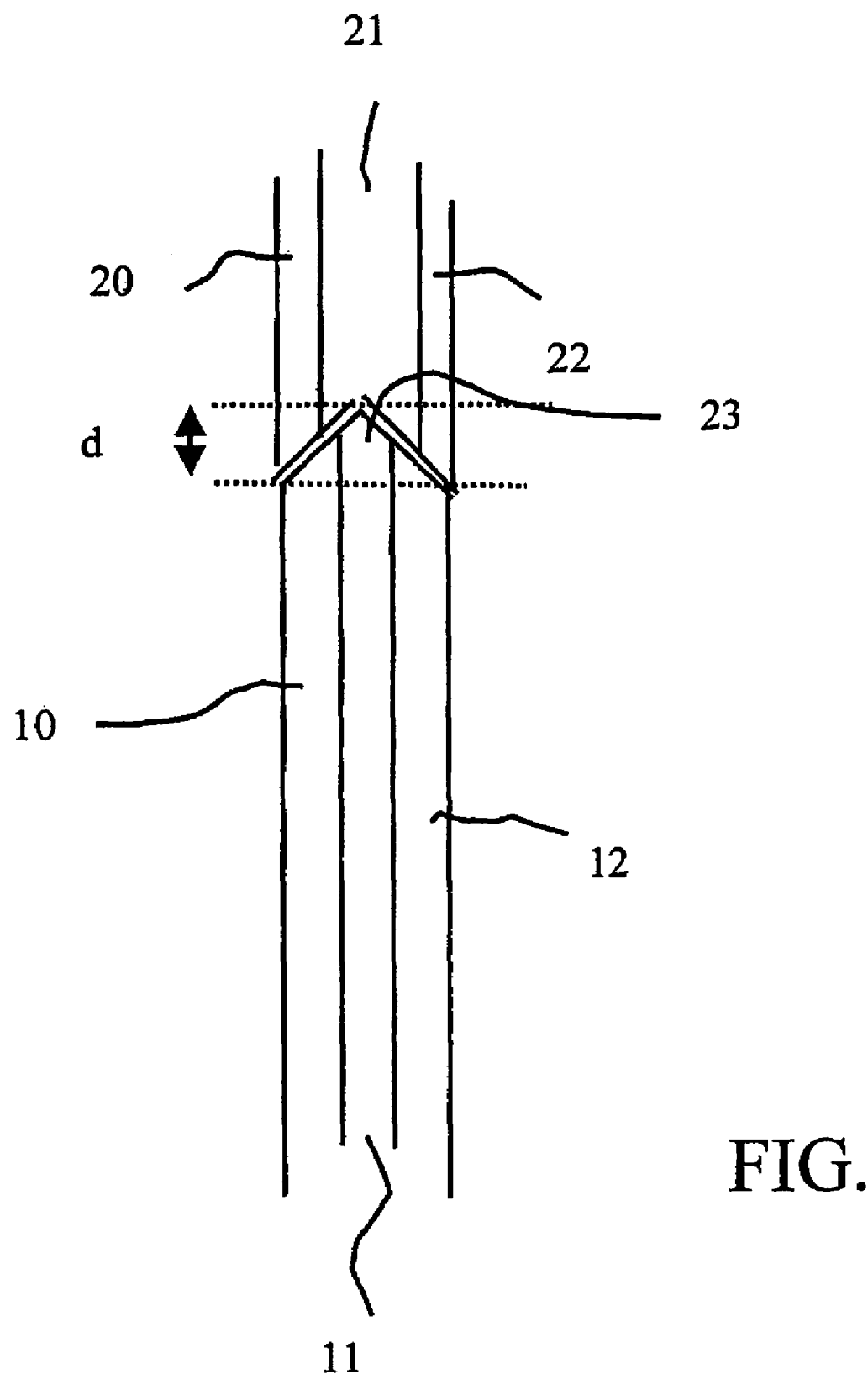
FIG. 2 shows schematically a connection between a main part and an end part of a pressure vessel in accordance with the invention.

FIG. 2 illustrates a preferred embodiment of the pressure vessel and method of the invention. The contact area shows a protrusion 23 of the layered structure of the main body into the central part 21 of the layered structure of the end part. The protrusion increases the contact area and, due to the protruding effect, increases the strength of the connection. Preferably, as shown in FIG. 2, the protrusion is formed on the main body. However, the roles could be reversed, i.e. the first part could be the end part and the second part could be the main body. In this embodiment the layer 11 with the continuous fibres shows an overlap along a length d with the layers 20 and 22 with continuous fibres. This overlap adds strength to the vessel.

The layers 20 and 22 are shown here as not touching the layer 11 since layer 11 is smaller than layer 21. In embodiments, however, the layer 11 could have a larger thickness than layer 21 and layers 11, 20 and 22 could be touching each other.

Figure 3:
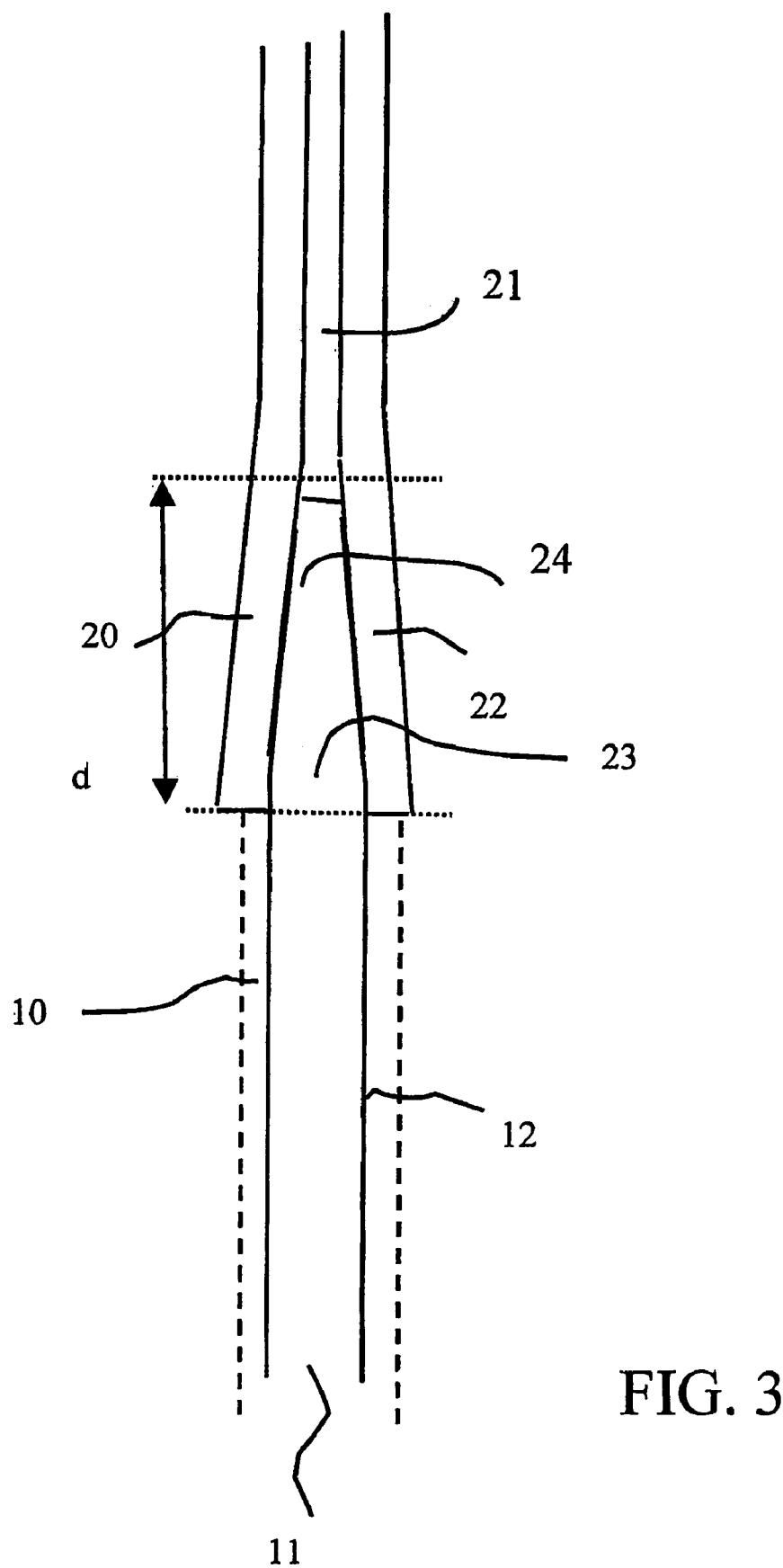
FIG. 3 shows schematically a connection between a main part and an end part of a pressure vessel in accordance with a preferred embodiment of the invention.

A preferred embodiment of the invention is shown in FIG. 3. Herein the second part is provided with a slit 24, and the layer 11 of the first part is provided with a protrusion of comparable length to the slit. Preferably this protrusion is bevelled. The optional layers 10 and 12 are indicated by dotted lines. Using such a bevel and slit enables a better control over the welding process and a longer length d of the weld. In this example the inner layer 21 is shown recessed, however a small layer of the thermoplastic material of layer 21 may be present at the inner sides of layers 20 and 22. Preferably the length d is between 10-100, preferably between 20 and 50 mm. Too small a length increases the risk that the weld or seam comprises weak spots, however too long an overlap increases the risk that the innermost or outermost parts of the seam are not well connected, which also gives problems. A first step in the welding method is preferably formed by inserting the protrusion into the slit to find (and then record) the end (bottom) of the slit. During welding the spinning can then be stopped approximately when the bottom of the slit is reached by the end of the protrusion; the spinning can even be stopped only when the end of the protrusion has passed the bottom of the slit by a certain predetermined distance. The length of the substantially continuous fibres if preferably at least as long, more preferably at least twice the length d.

Figure 4:
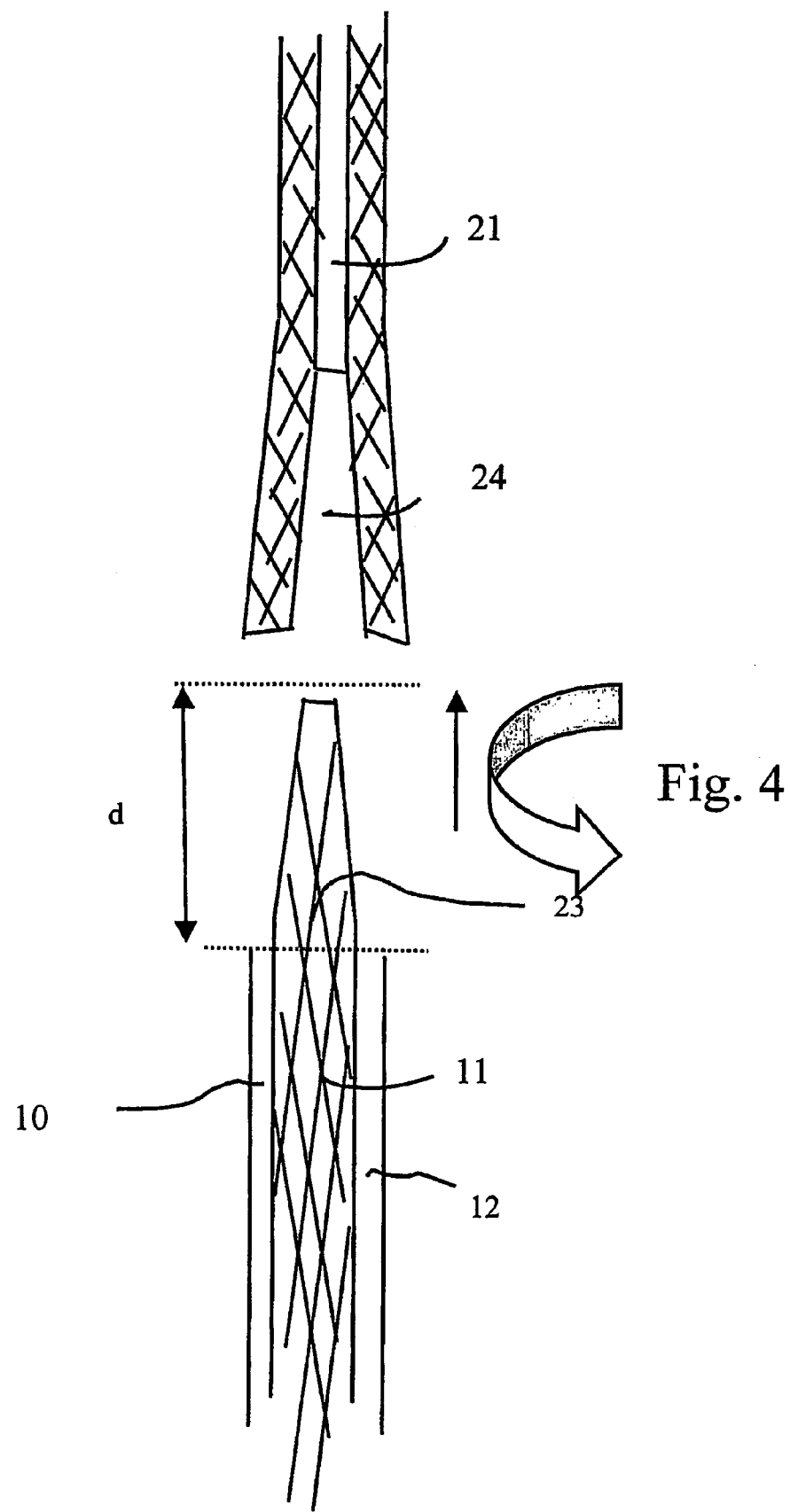
FIG. 4 shows schematically how the layers are connected together

FIG. 4 shows in more detail how the connection is made. The first part comprises the layer 11, which is provided with substantially continuous fibres, schematically indicated by the criss-cross pattern. The continuous fibres are preferably oriented in such manner, i.e. in a criss-cross manner, which can be achieved by winding the fibres and thermoplastic material on a mandrel in a criss-cross pattern and then heating to fuse and/or consolidate the thermoplastic material. In this manner a tube can be made, this tube may optionally be provided with an inner layer (liner) 12, and an outer layer (surface layer) 10, the tube is then cut into segments, where after the edges of the segments are bevelled on a lathe.

The two parts are brought into position, close to each other, where after one or both of the parts is rotated (as indicated by the arrow) and the two parts are brought towards each other, during which movement, the bevelled end 23 enters the slit 24. Bevelling the edge increases the strength of the weld, and in addition it decreases the risk that, immediately at the start of the welding, the edge of the first part deforms the other edge of the second part. The bevelled shape of the protrusion guides this part into the slit, even if there is small misalignment. The protrusion 23 and/or the slit 24 may be pre-treated prior to welding. Pre-treatment may be constituted by the provision of a thin layer of thermoplastic over the part 23 and/or inside the slit 24.

FIG. 5 illustrates a method for making a second part, in this example an end part 2 shaped as a cap. A layered structure is made comprising three layers, a layer of thermoplastic material (the white layer in FIG. 5) sandwiched in between two layers of thermoplastic material with substantially continuous fibres (the layers depicted by a criss-cross pattern in the figure). In this example the central layer comprises polypropylene within which cut glass fibres (having lengths of the order of ten to 100 millimeters) are mixed, whereas the two outer layers comprise fibre mats or fibre fabrics, for instance woven fabrics of glass fibres of substantially continuous length, in a polypropylene matrix. One way of making such a layered structure is to make a stack of a polypropylene film/a continuous glass fibre fabric/a polypropylene film with cut fibres/a continuous glass fibre fabric/polypropylene film, and then heating this stack to fuse the layers. Thereafter a (round) piece 2' is cut from the thus made stack. This round piece is drawn over a shaping die, or compression moulded in a closed mould, to provide a cap-shaped part 2. Some heat is applied during the deformation of 2' into 2. Thereafter the cap-shaped part 2 can be brought close to a circular shaped die 51 with an bevelled end 52, and the cap 2 is driven into the die, forming a slit at the edge. Alternatively, the die 51 can be integrated in the compression mould used to shape part 2, combining the shaping of the part and of the slit into one step. Alternatively the slit may be cut into the end cap. A combination of these methods, for instance first forming a small slit with the die 51 and then making a larger or deeper slit by means of cutting, is also possible.

Figure 6:
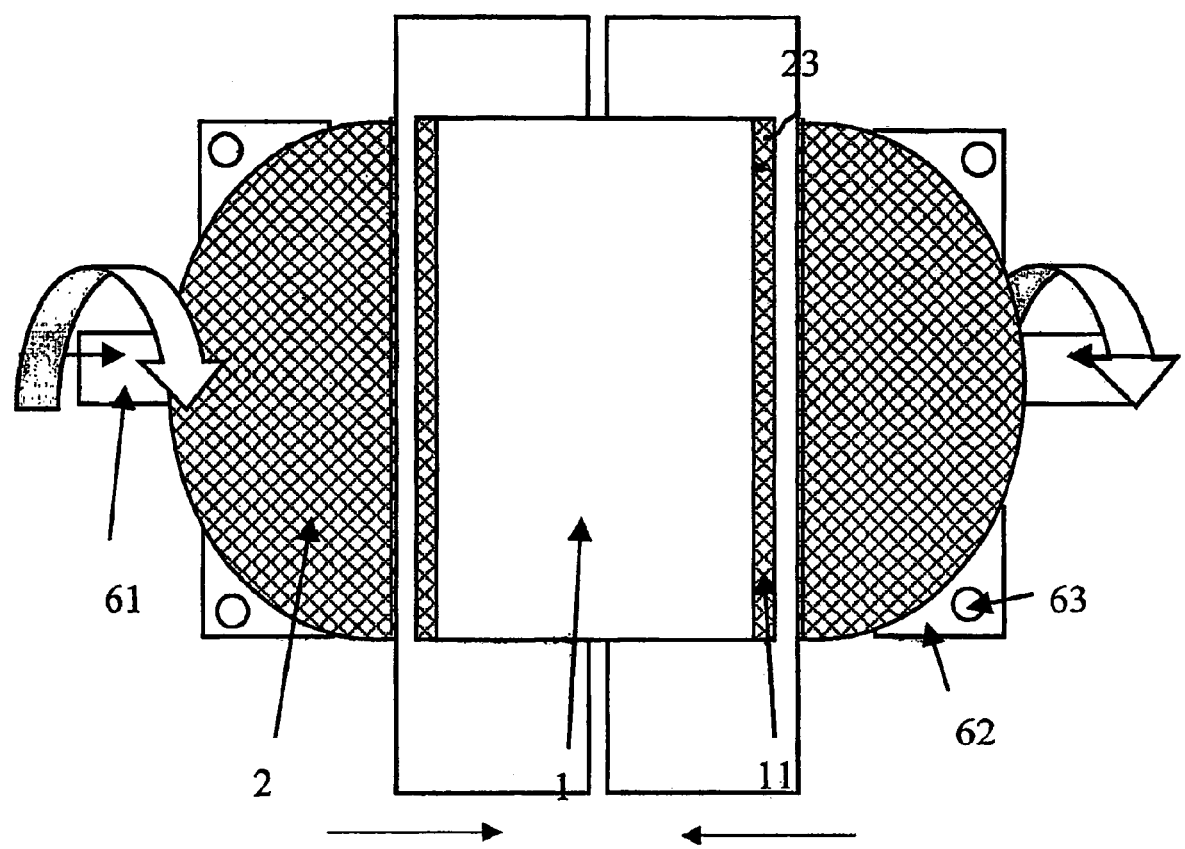
FIG. 6 illustrates the method in accordance with the invention.

FIG. 6 illustrates a preferred embodiment of the invention. A body part 1 and two end parts 2 are positioned in a lathe. The end parts 2 are spun synchronously in a lathe and brought towards part 1. Because the end parts 2 are spun synchronously they keep before, throughout and after the welding process their mutual relative position. Alternatively, part 1 can be spun while the end parts 2 are not rotating. Both end parts are provided with handles 62 with apertures 63. Because the end caps keep their mutual orientation, the handles also keep their mutual orientation. The friction weld is made.

In short the invention can be described by:

A plastic pressure vessel comprises a first (1, 2) and a second part (2,1) welded to each other. The first part (1) comprises a layer (11) of thermoplastic material having substantially continuous fibres. The second part comprises a layered structure having a first (20) and a second (22) layer of thermoplastic material having substantially continuous fibres separated by a central (21) layer comprising thermoplastic material. The layer having substantially continuous fibres (11) of the first part extends over a length (d) sandwiched in between and connected with the first (20) and second (22) layer of thermoplastic material having substantially continuous fibres of the second part. Preferably the second part is provided with a slit (24) and the first part with a fitting protrusion, preferably with a bevelled end (23). In the method the two parts are friction welded.

It will be apparent that the invention is not restricted to the above given exemplary embodiments, but that within the scope of the invention variations are possible.

For instance, in the examples layer 11 is along a length interspersed (sandwiched between outer layers 20 and 22. So the sandwich can be described by A (layer 20) B (layer 11) A (layer 22). These 'outer layers' may themselves (one and/or the other) be covered with further layers. All sandwiched layers comprise substantially continuous fibres. Preferably the layers 20 and 22 are similar or the same, because this simplifies the structure and process, but they may differ in composition (for instance, if the outermost layer is to provide a different kind of protection than the innermost layers, or simply a different color), in which case the sandwich structure can be described as ABA'. More complicated structures would be formed by providing two protruding layers sandwiched between two other layers (ABAB), two between three ABABA etc. The shown embodiment (of structure ABA, ABA') is preferred due to its simplicity and low costs.

Furthermore in the above disclosed embodiments the vessel comprises two (when comprised on two end caps) or three (when comprised of a body part and two end parts) parts. Although these embodiments are preferred embodiments from the point of view of simplicity of design, the invention is not restricted to pressure vessels comprising two or three parts, in embodiments the pressure vessels may comprise more than three parts (for instance two body parts and two end parts). Such embodiments may for instance be useful if the pressure vessel is to be provided with a side entrance. The pressure vessel may then have a simple cylindrical body part, a body part with a side entrance, which are connected to each other by spinning the simple body part and connecting the two, and thereafter providing two end caps.

The invention claimed is:

1. Plastic pressure vessel for a fluid comprising a first and a second part connected to each other, one of the first and second part being a main body or an end part, characterized in that the first part comprises at least one layer of thermoplastic material having substantially continuous fibres, and the second part comprises a layered structure having a first and a second layer of thermoplastic material, at least one of said first and second layers having substantially continuous fibres, said first and second layers being separated by a inner plastic layer, the layer having substantially continuous fibres of the first part extending over a length (d) sandwiched in between and connected with the first and second layer of thermoplastic material of the second part.

2. Plastic pressure vessel as claimed in claim 1, characterized in that the first and second layer of the second part comprise substantially continuous fibres.

3. Plastic pressure vessel as claimed in claim 1, characterized in that at least one of the first and second part is a cylindrically formed main body of the pressure vessel, at both sides being provided with end parts.

4. Plastic pressure vessel as claimed in claim 1,2, or 3, characterized in that the second part comprises a slit into which a protrusion of the layer comprising substantially continuous fibres of the first part extends.

5. Plastic pressure vessel as claimed in claim 4, characterized in that the protrusion is bevelled.

6. Plastic pressure vessel as claimed in claim 1, characterized in that the connection of the end part and the main body is formed such that the continuous fibres containing layer of the first part extends, seen in a direction parallel to the layers, over a length (d) between 20 and 50 mm in between the first and second layers of the second part.

7. Plastic pressure vessel as claimed in claims 1, 2 or 6, characterized in that the length of the substantially continuous fibres in all relevant layers is at least equal, preferably at least twice the length (d) of overlap between the layers.

8. Plastic pressure vessel as claimed in claim 1, characterized in that the substantially continuous fibres are laid in both parts and all layers in a criss-cross pattern.

9. Plastic pressure vessel as claimed in claim 1, characterized in that the first and second part are connected to each other by friction welding.

10. Plastic pressure vessel as claimed in claim 9, further comprising a central part and two end parts, wherein opposite ends of the central part are each connected to an end part by means of friction welding.

11. Plastic pressure vessel as claimed in claim 9 or 10, wherein each end part includes a handle.

12. Plastic pressure vessel as claimed in claim 1, characterized in that the connection of the end part and the main body is formed such that the continuous fibres containing layer of the first part extends, seen in a direction parallel to the layers, over a length (d) between 10 and 100 mm in between the first and second layers of the second part.

* * * * *